United States Patent
Lee et al.

(10) Patent No.: US 10,781,289 B2
(45) Date of Patent: Sep. 22, 2020

(54) AEROGEL PARTICLES AND METHOD OF MAKING THE SAME

(71) Applicant: NATIONAL CHENG KUNG UNIVERSITY, Tainan (TW)

(72) Inventors: Hsun-Ku Lee, Kaohsiung (TW); Pei-Chian Tsai, Tainan (TW); Hsin-Ying Yu, Changhua County (TW); Dong-Wei Wu, Kaohsiung (TW)

(73) Assignee: National Cheng Kung University, Tainan (TW)

( * ) Notice: Subject to any disclaimer, the term of this patent is extended or adjusted under 35 U.S.C. 154(b) by 33 days.

(21) Appl. No.: 16/205,644

(22) Filed: Nov. 30, 2018

(65) Prior Publication Data

US 2020/0172696 A1     Jun. 4, 2020

(51) Int. Cl.
| | |
|---|---|
| *C08G 77/06* | (2006.01) |
| *C08J 9/28* | (2006.01) |
| *C01B 33/158* | (2006.01) |
| *B01J 13/00* | (2006.01) |
| C08G 101/00 | (2006.01) |

(52) U.S. Cl.
CPC .......... *C08G 77/06* (2013.01); *B01J 13/0091* (2013.01); *C01B 33/1585* (2013.01); *C08J 9/286* (2013.01); *C08G 2101/0091* (2013.01); *C08J 2201/0502* (2013.01); *C08J 2201/0504* (2013.01); *C08J 2205/026* (2013.01); *C08J 2383/04* (2013.01)

(58) Field of Classification Search
CPC .............. C01B 33/1585; B01J 13/0091; C08J 2205/026
See application file for complete search history.

(56) References Cited

U.S. PATENT DOCUMENTS

| | | | |
|---|---|---|---|
| 2010/0272996 A1* | 10/2010 | Holmes | C01B 33/12 428/402 |
| 2017/0101321 A1* | 4/2017 | Kugimiya | C01B 33/1585 |

FOREIGN PATENT DOCUMENTS

| | | | |
|---|---|---|---|
| TW | I516447 B | | 1/2016 |
| TW | I561561 B | | 12/2016 |
| WO | WO2009/010945 | * | 1/2009 |

OTHER PUBLICATIONS

Superhydrophobic Silica Aerogel Microspheres from Methyltrimethoxysilane: Rapid Synthesis via Ambient Pressure Drying and Excellent Absorption Properties authored by Yun et al. and published in RSC Advances (2014) 4, 4535-4542.*
"Tailoring Structural and Physical Properties of Polymethylsilsesquioxane Aerogels by Adjusting NH3.H2O Concentration" authored by Lei et al. and published in Microporous and Mesoporous Materials (2018) 236-243.*
"Methyltrimethoxysilane based Monolithic Silica Aerogels via Ambient Pressure Drying" authored by Bhagat et al. and published in Microporous and Mesoporous Materials (2007) 350-355.*
Abstract for CN 108033455 (May 2018).*

* cited by examiner

*Primary Examiner* — Marc S Zimmer
(74) *Attorney, Agent, or Firm* — Rosenberg, Klein & Lee

(57) ABSTRACT

A method includes the steps of (a) adding an organosilicon compound containing methyl groups and a surfactant into water, mixing well and carrying out hydrolysis to get a mixed aqueous solution; (b) mixing the mixed aqueous solution with 0.1-0.2M ammonium hydroxide and a remaining percentage of an organic solvent, and stirring the mixture under nitrogen atmosphere for emulsion polymerization to get a water-in-oil (w/o) emulsion; and (c) removing the organic solvent and drying the w/o emulsion to get aerogel particles. Thereby the aerogel particles are produced by the present method without hydrophobic treatment and solvent exchange. Therefore the cost and time used for preparing the aerogel particles are saved.

4 Claims, 6 Drawing Sheets

AEROGEL PARTICLES AND METHOD OF MAKING THE SAME

BACKGROUND OF THE INVENTION

Field of the Invention

The present invention relates to aerogel particles and a method of making the same, especially to aerogel particles and a method of making the same that use organosilicon compounds containing methyl groups as precursors so that complicated processes such as surface hydroxylation of aerogel, solvent exchange, etc. are no more required and the aerogel particles are produced in a dispersed phase with low surface tension. Both hydrophilicity and hydrophobicity of the aerogel particles can be adjusted.

Description of Related Art

Aerogel is solid with porous microstructure and having various properties such as high specific surface area (SSA), high porosity, low bulk density, low thermal conductivity, etc. These features make aerogel more competitive in various applications such as heat insulation, sound insulation, energy saving, etc.

The aerogel manufacturing process mainly includes three steps: first preparing hydrogel by using sol-gel method, gel aging and drying. During the common process for preparing aerogel, the aerogel is dried in open air (air drying) or under supercritical fluid conditions (supercritical drying). The supercritical drying has high cost. Although air drying reduces the cost, the aerogel prepared needs further treatment including solvent substitution and surface modification. In the solvent substitution step, water in the gel is substituted by a solvent with small surface tension for preventing a collapse of porous structure of the aerogel caused by capillary force during the drying process. During the surface modification, hydroxyl groups on surface of the aerogel are silylated. Thus the aerogel will return to the original shape owing to repulsive force between alkyl groups after shrinkage during drying.

Refer to Taiwanese Pat. App. Pub. No. 1516447 B, an aerogel and a method of producing same are revealed. The method includes the steps of: preparing silica hydrosols; dispersing silica hydrosols in a hydrophobic solvent to form a water-in-oil (w/o) emulsion; carrying out gelation of silica sols for converting the W/O emulsion into a gel dispersion solution; replacing water in the gel with a solvent with small surface tension; processing the gel by specific hydrophobic agent; and removing the solvent for substitution. In this prior art, the aerogel is prepared under normal or reduced pressure. But hydrophobic modification and solvent substitution should be carried out after emulsion polymerization. Then the gel is dried to get aerogel particles. The manufacturing process is quite complicated.

Refer to Taiwanese Pat. App. Pub. No. 1561561 B, aerogel particles and a method of making the same are revealed. The method consists of mixing an organosilicon compound with an organic solvent to get a mixed solution; adding an acid catalyst into the mixed solution for performing hydrolysis; adding a basic catalyst into the mixed solution for carrying out condensation reaction, adding a hydrophobic dispersion medium during condensation reaction, and stirring the mixed solution for carrying out gelation to produce a plurality of aerogel particles. Although the ball-shaped aerogel particles obtained are more structurally uniform, it has certain shortcomings. The acid catalyst is used for hydrolysis. After condensation polymerization, hydrophobic modification is required. During hydrophobic modification, an acyl chloride molecule is added to react with a hydroxyl group of the aerogel particles. The products of the reaction include highly acidic waste solutions. Moreover, the aerogel particles can't be dried until they have hydrophobicity. Thus the manufacturing process is more complicated and the production cost is high.

Thus there is room for improvement and there is a need to provide a novel process for manufacturing aerogel.

SUMMARY OF THE INVENTION

Therefore it is a primary object of the present invention to provide aerogel particles and a method of making the same that use organosilicon compounds containing methyl groups as precursors. No complicated steps such as surface hydroxylation of aerogel, solvent exchange, etc. are required and the aerogel particles are produced in a dispersed phase with low surface tension. The hydrophilicity and hydrophobicity of the aerogel particles can be adjusted.

In order to achieve the above object, a method for preparing aerogel particles includes the steps of (a) adding a 50-70 vol. % organosilicon compound containing methyl groups and a 0.1-0.3 vol. % surfactant into water, mixing evenly and carrying out hydrolysis to get a mixed aqueous solution; (b) mixing the 12-16 vol. % mixed aqueous solution with 5-6 vol. %, 0.1-0.2M ammonium hydroxide ($NH_4OH$) and a remaining percentage of an organic solvent according to the percentage by volume (vol %) and stirring the mixture at 1,000-5,000 rpm under nitrogen atmosphere for emulsion polymerization to get a water-in-oil (w/o) emulsion; and (c) removing the organic solvent and drying the w/o emulsion at 80° C.-150° C. in a normal atmosphere for 2-6 hours to get aerogel particles. The aerogel particles can be further processed by heat treatment at 400° C.-500° C. under normal atmosphere for 2-8 hours to get hydrophilic aerogel particles.

Preferably, the organosilicon compound containing methyl groups is selected from the group consisting of methyltrimethoxysilane, methyltriethoxysilane, dimethoxydimethylsilane, dimethyldiethoxylsilane, and polydimethylsiloxane. The organic solvent is selected from the group consisting of alkanes, alcohols, ethers, and ketones such as hexane, ethanol, dimethyl ether, and acetone. The surfactant is selected from the group consisting of hexadecyl-trimethyl-ammonium bromide, sodium dodecyl sulfate, sodium dodecyl benzene sulfonate, and n-hexadecyltrimethylammonium chloride.

Thereby no complicated steps such as surface hydroxylation of aerogel and solvent exchange are required. Either hydrophobic aerogel particles or aerogel particles with different hydrophilicity can be prepared by the present invention. The disadvantages of the conventional method such as complicated and time-consuming preparation processes, high production cost, etc. are overcome by the present invention.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
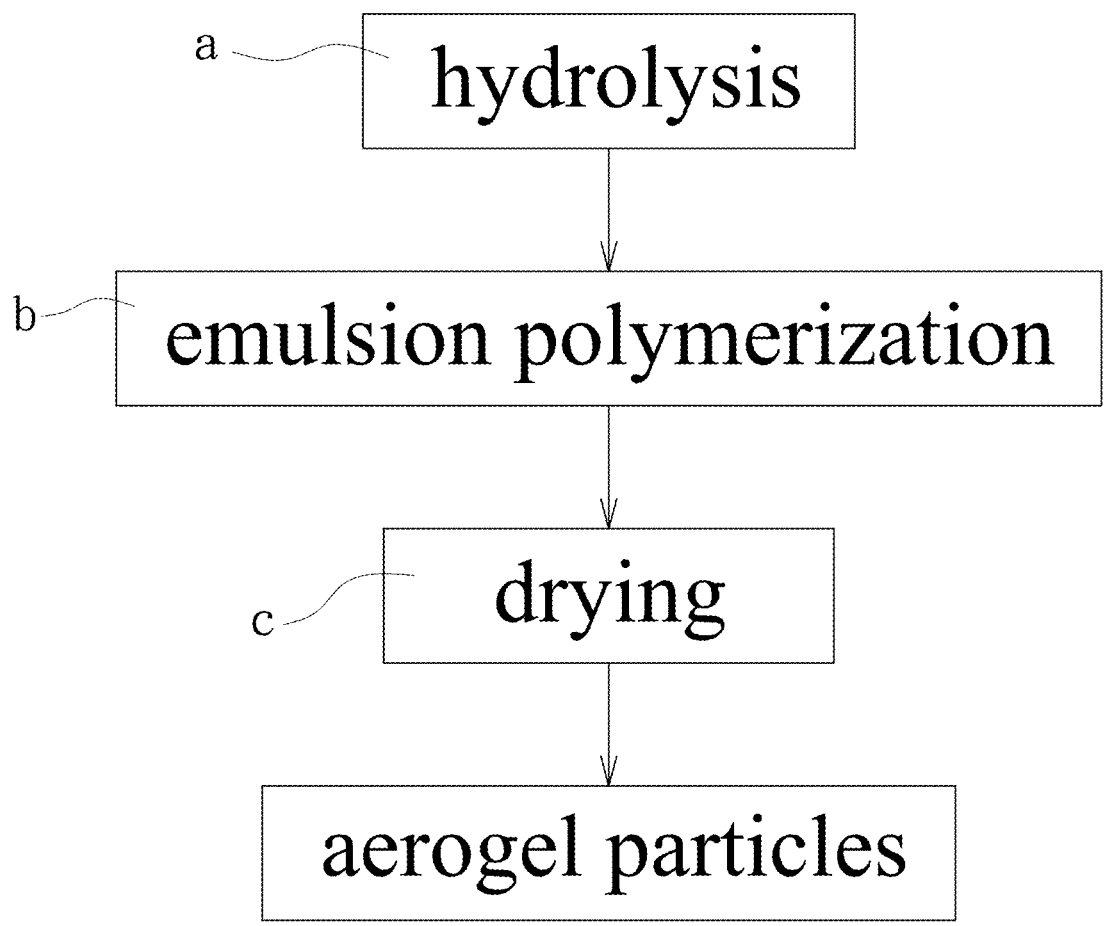
FIG. 1 is a flow chart showing steps of an embodiment according to the present invention.

Refer to FIG. 1, a method for making aerogel particles according to the present invention includes the following steps. (a) adding a 50-70 vol. % organosilicon compound containing methyl groups and a 0.1-0.3 vol. % surfactant into water, mixing evenly and carrying out hydrolysis to get a mixed aqueous solution. (b) mixing the 12-16 vol. % mixed aqueous solution with 5-6 vol. %, 0.1-0.2M ammonium hydroxide ($NH_4OH$) and a remaining percentage of an organic solvent according to the percentage by volume (vol %) and stirring the mixture at 1,000-5,000 rpm under nitrogen atmosphere for emulsion polymerization to get a water-in-oil (w/o) emulsion. (c) removing the organic solvent and drying the w/o emulsion at 80° C.-150° C. in a normal atmosphere for 2-6 hours to get aerogel particles. In a preferred embodiment, the organosilicon compound containing methyl groups includes methyltrimethoxysilane, methyltriethoxysilane, dimethoxydimethylsilane, dimethyldiethoxylsilane, and polydimethylsiloxane while the organic solvent can be alkanes, alcohols, ethers, or ketones such as hexane, ethanol, dimethyl ether, and acetone. The surfactant is selected from hexadecyl-trimethyl-ammonium bromide, sodium dodecyl sulfate, sodium dodecyl benzene sulfonate, and n-hexadecyltrimethylammonium chloride.

Figure 2:
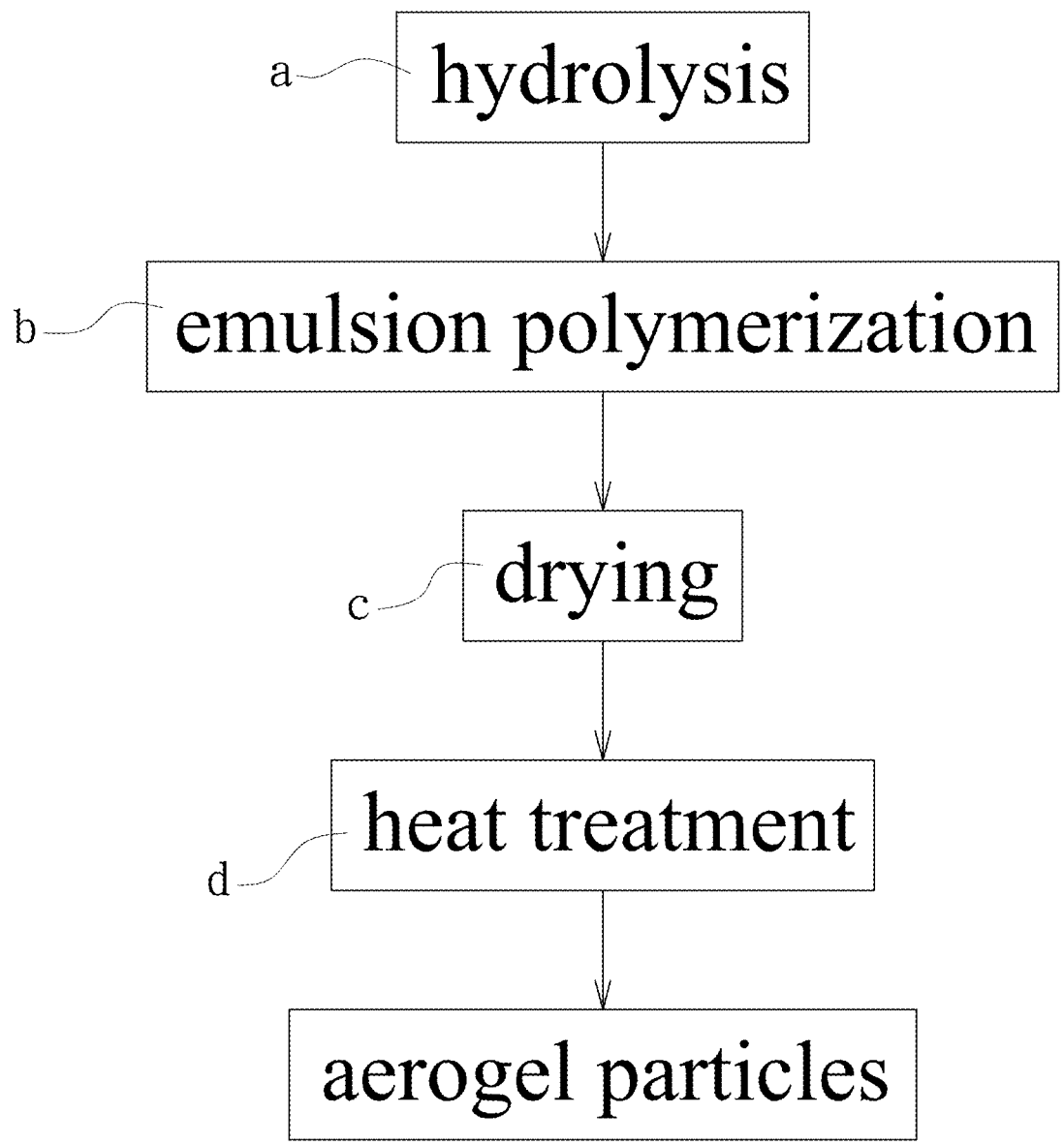
FIG. 2 is a flow chart showing steps of another embodiment according to the present invention.

As shown in FIG. 2, the method further includes a step (d) of carrying out heat treatment of aerogel particles at 400° C.-500° C. under normal atmosphere for 2-8 hours to get hydrophilic aerogel particles.

In this embodiment, the organosilicon compound containing methyl groups is used as precursor. After hydrolysis, condensation polymerization of the organosilicon compound is carried out in the w/o emulsion. Then the w/o emulsion is dried to get the hydrophobic aerogel particles directly and the particle diameter of the aerogel is 75-330 μM. Once the hydrophobic aerogel particles are processed by high temperature heat treatment, the hydrophilicity of the aerogel particles is increased.

Embodiment One

Figure 3:
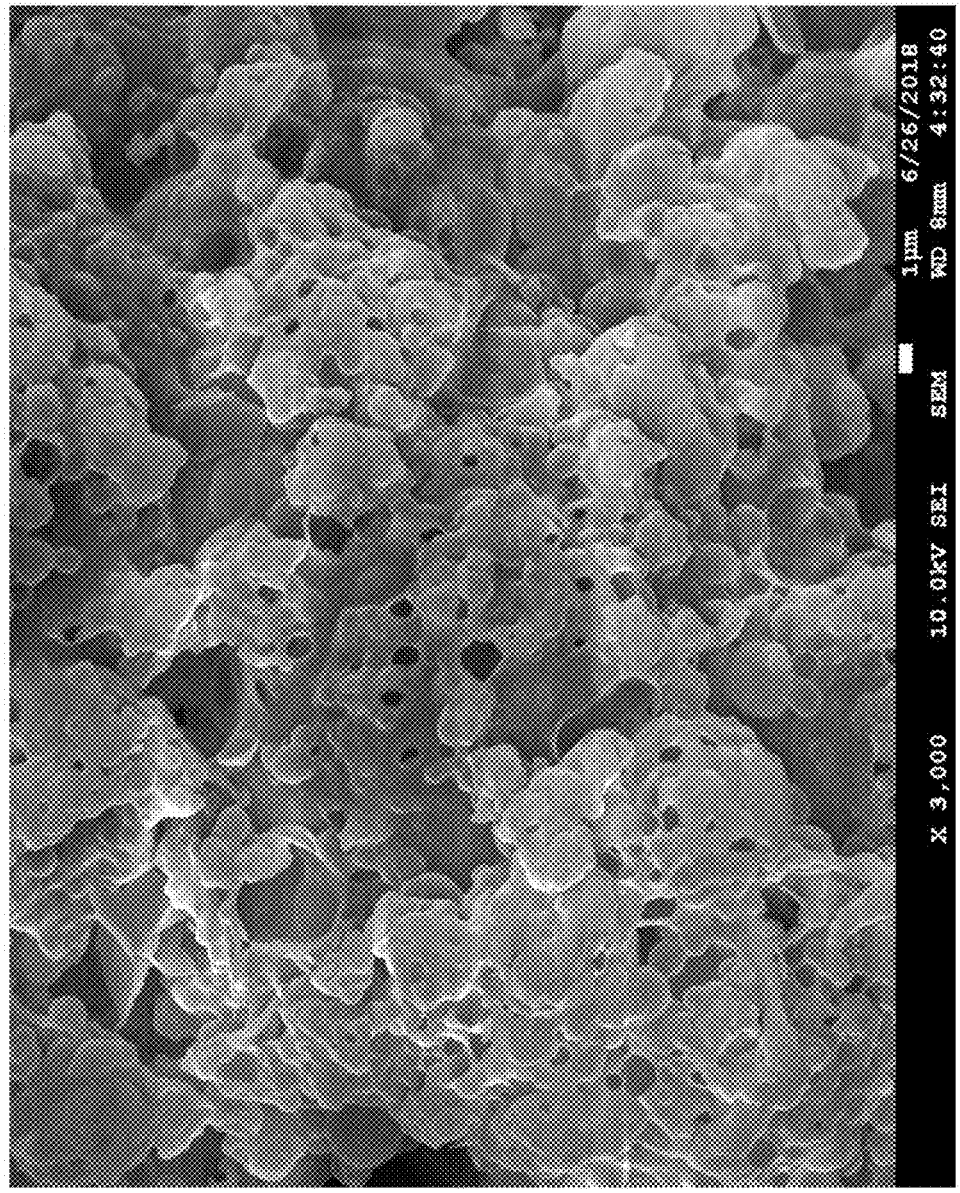
FIG. 3 is a scanning electron micrograph of aerogel particles magnified 3000× of an embodiment according to the present invention.
Figure 4:
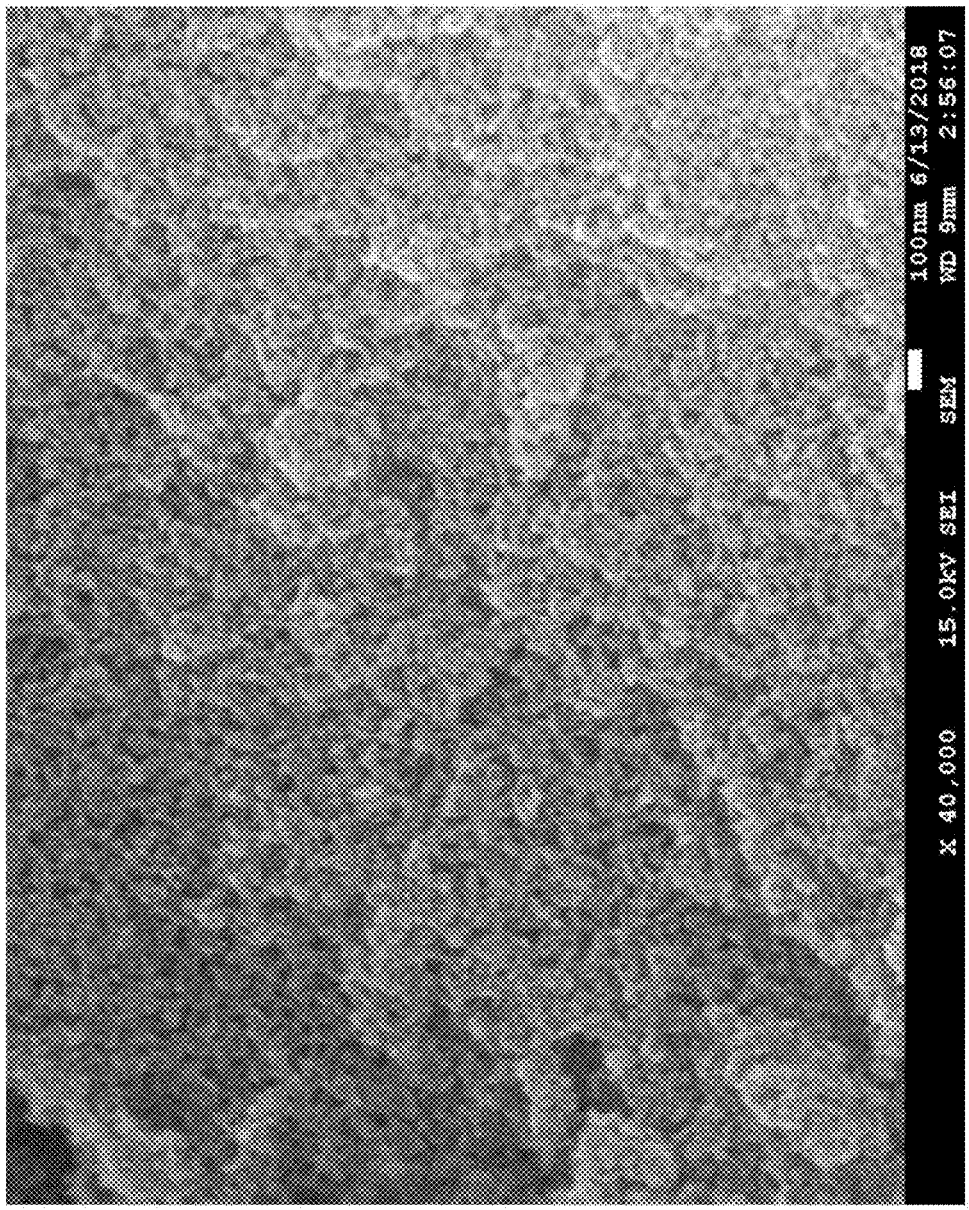
FIG. 4 is a scanning electron micrograph of aerogel particles magnified 40000× of an embodiment according to the present invention.

Add 30 ml dimethoxydimethylsilane (as precursor) and 0.1 g hexadecyl-trimethyl-ammonium bromide (as surfactant) into 15 ml water and stir well for 20 minutes. Then add 20 ml 0.2M ammonia water into the above aqueous solution as a catalyst for condensation polymerization and stir the solution constantly for several minutes. Next 300 ml ethanol is poured into the aqueous solution and stirred at 2,500 rpm for emulsion polymerization to form a water-in-oil (w/o) emulsion. The dispersed phase gradually changes into aerogel particles owing to condensation polymerization after about 10 minutes. Next, after removal of ethanol, the w/o emulsion is dried at 80° C. in a normal atmosphere for 2 hours (also can be dried at room temperature for a long time) and then dried again at 150° C. for 4 hours to get hydrophobic aerogel particles. A scanning electron microscope (SEM) is used to capture images showing appearance and distribution of the aerogel particles at different magnifications, as shown in FIG. 3 and FIG. 4.

Embodiment Two

Add 30 ml methyltrimethoxysilane (as precursor) and 0.15 g sodium dodecyl benzene sulfonate (as surfactant) into 30 ml water and stir well for 20 minutes. Then add 20 ml 0.2M ammonia water into the above aqueous solution as a catalyst for condensation polymerization and stir the aqueous solution constantly for several minutes. Next 300 ml acetone is poured into the aqueous solution and stirred at 2,500 rpm for emulsion polymerization to obtain a water-in-oil (w/o) emulsion. The dispersed phase gradually changes into aerogel particles owing to condensation polymerization after about 10 minutes. Next after removal of acetone, the w/o emulsion is dried at 80° C. in a normal atmosphere for 2 hours (also can be dried at room temperature for a long time) and then dried again at 150° C. for 4 hours to get hydrophobic aerogel particles.

Embodiment Three

Add 30 ml polydimethylsiloxane (as precursor) and 0.1 g n-hexadecyltrimethylammonium chloride (as surfactant) into 20 ml water and stir well for 20 minutes. Then add 20 ml 0.1M ammonia water into the above aqueous solution as a catalyst for condensation polymerization and stir the solution constantly for several minutes. Next 300 ml n-hexane is poured into the aqueous solution and stirred at 2,500 rpm for emulsion polymerization to get a water-in-oil (w/o) emulsion. The dispersed phase gradually changes into aerogel particles by condensation polymerization after about 10 minutes. Next after removal of n-hexane, the w/o emulsion is dried at 80° C. in a normal atmosphere for 2 hours (also can be dried at room temperature for a long time) and then dried again at 150° C. for 4 hours to get hydrophobic aerogel particles.

Embodiment Four

Add 30 ml dimethyldiethoxylsilane (as precursor) and 0.15 g sodium dodecyl sulfate (as surfactant) into 25 ml water and stir well for 20 minutes. Then add 20 ml 0.2M ammonia water into the above aqueous solution as a catalyst for condensation polymerization and stir the solution constantly for several minutes. Next 300 ml dimethyl ether is poured into the aqueous solution and stirred at 2,500 rpm for emulsion polymerization to get a water-in-oil (w/o) emulsion. The dispersed phase gradually changes into aerogel particles by condensation polymerization after about 10 minutes. Next after removal of dimethyl ether, the w/o emulsion is dried at 80° C. in a normal atmosphere for 2 hours (also can be dried at room temperature for a long time) and then dried again at 150° C. for 4 hours to get hydrophobic aerogel particles.

Figure 5:
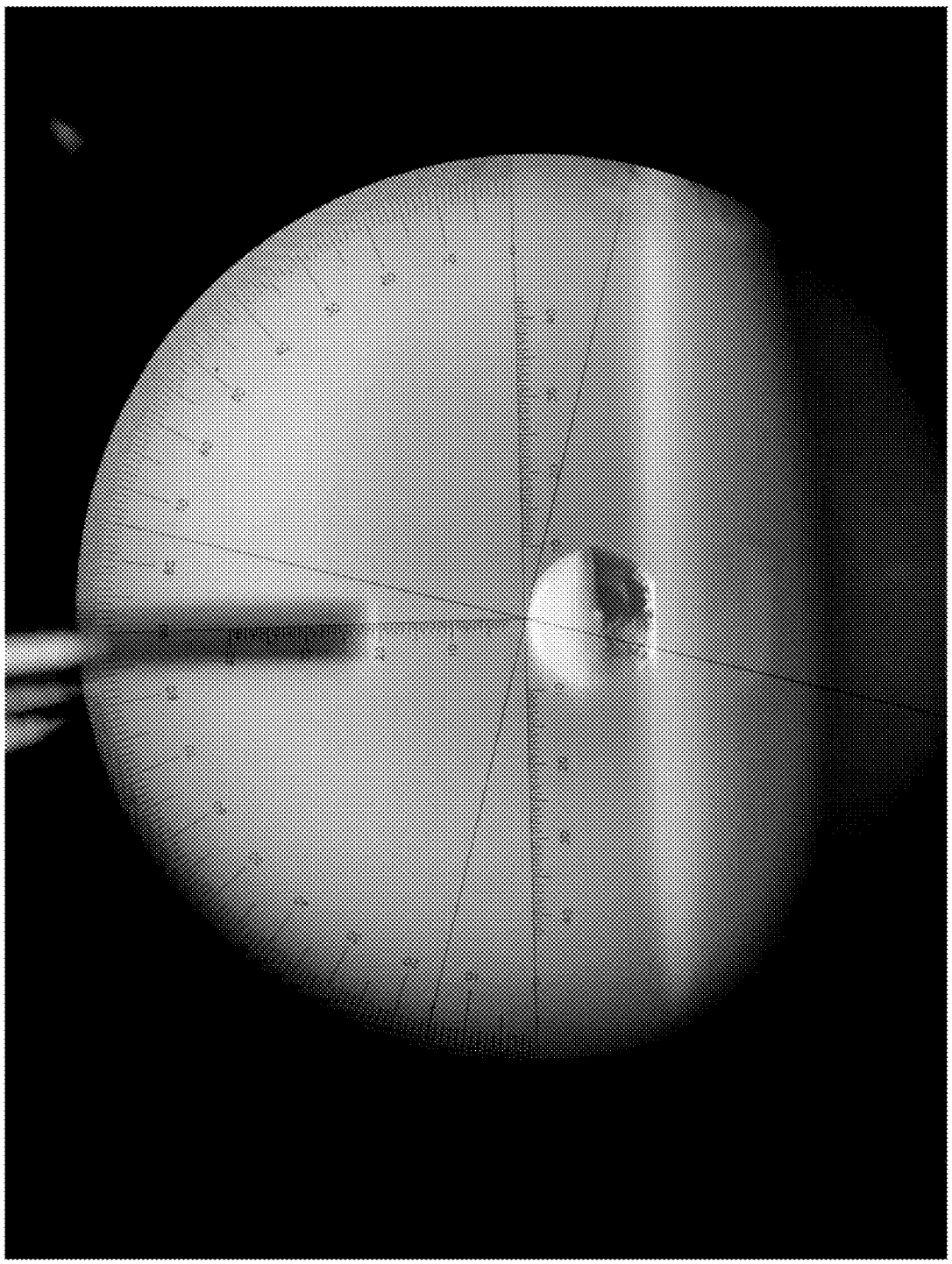
FIG. 5 is a photo showing a contact angle of hydrophobic aerogel particles of an embodiment according to the present invention.

A plurality of tests is done for analysis of the hydrophobic aerogel particles, including data obtained by contact angle measurement with a contact angle meter. The test results are shown in FIG. 5 and Table 1. The bulk density, the specific surface area (SSA), the porosity, the particle diameter, the thermal conductivity and the contact angle of the hydrophobic aerogel particle are 0.037 g/cm$^3$, 546.83 m$^2$/g, 90.56%, 75-330 μm, 0.035 W/m·K, and 145 degrees, respectively.

TABLE 1

| property | data |
|---|---|
| bulk density (g/cm$^3$) | 0.037 |
| specific surface area (m$^2$/g) | 546.83 |
| porosity (%) | 90.56 |
| particle diameter (μm) | 75-330 |
| thermal conductivity (W/m · K) | 0.035 |
| contact angle | 145° |

Embodiment Five

Figure 6:
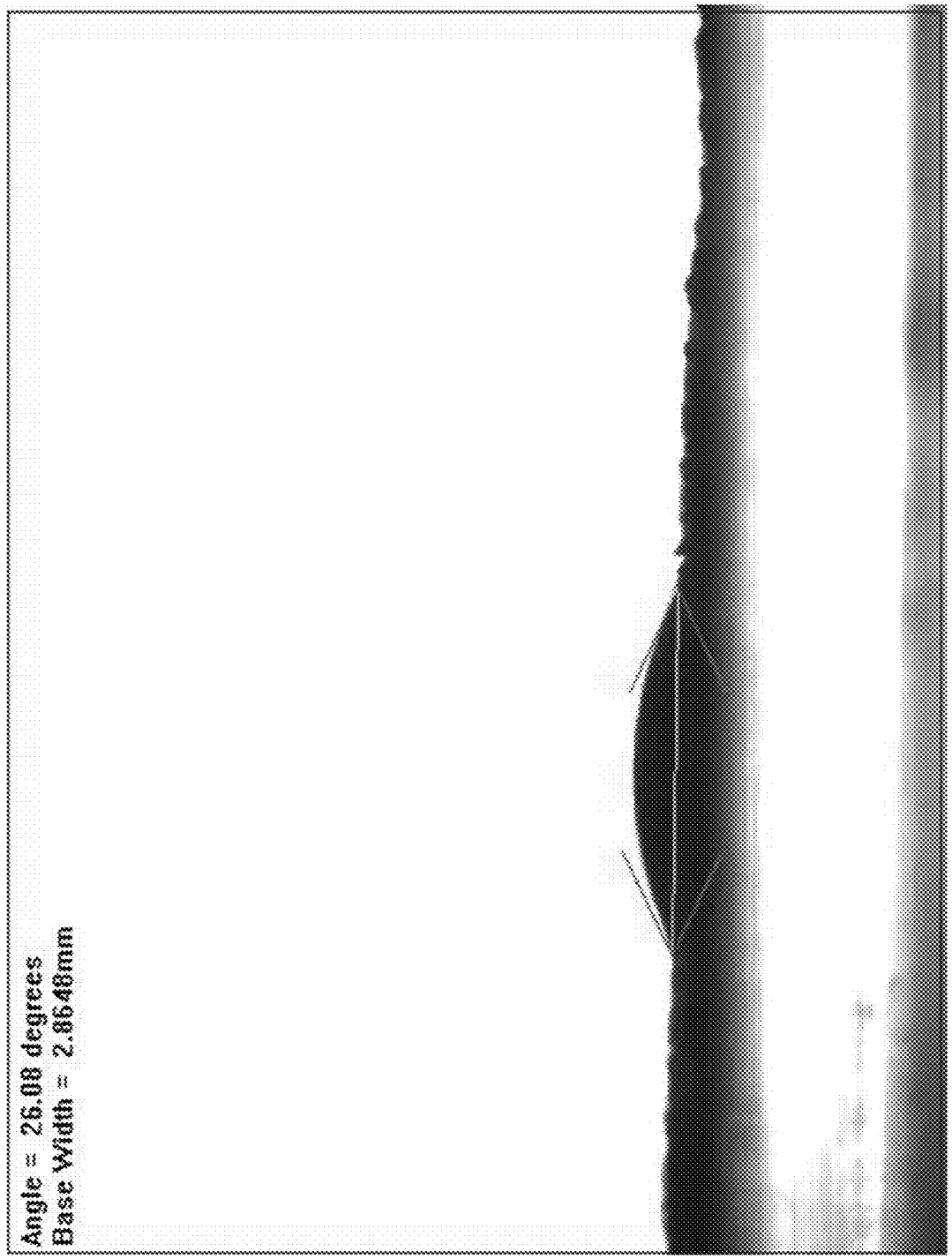
FIG. 6 is a photo showing a contact angle of hydrophilic aerogel particles of an embodiment according to the present invention.

Aerogel particles with different hydrophilicity are obtained after heat treatment of the hydrophobic aerogel particles produced by the method in the embodiment one at 400° C. and 450° C. for 2 hours, respectively. Refer to FIG. 6, measure the contact angle of the hydrophilic aerogel particles obtained after 400° C. heat treatment for 2 hours. The result shows that the contact angle is 26.08 degrees.

In summary, compared with the technique available now, the present invention has the following advantages:

1. In the present invention, the hydrolyzed organosilicon compound is mixed with an organic solvent to get a water-in-oil (w/o) emulsion after emulsion polymerization. No surface treatment (such as surface hydroxylation) or hydrophobic dispersion medium is required for modifying the surface into the hydrophobic one. The emulsion is dried directly to get hydrophobic aerogel particles. Thus the method of the present invention shortens the production process and reduces the production cost.

2. No acid catalysts and chloro-acetylated organic molecules are used for hydrolysis and modification. Thus the shortcoming of the conventional method such as generation of highly acidic waste solutions can be overcome.

3. The hydrophilicity of the aerogel particles can be adjusted by heat treatment for production of aerogel particles with different properties that are more widely used in industrial applications.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A method for making aerogel particles, comprising:
    adding at least one organosilicon compound containing methyl groups and at least one surfactant into water to produce an aqueous solution containing 50-70 percentage by volume (vol. %) of the organosilicon compound and 0.1-0.3 vol. % of the surfactant;
    mixing the aqueous solution evenly and carrying out hydrolysis to produce a mixed aqueous solution;
    mixing the mixed aqueous solution with 0.1-0.2M ammonium hydroxide (NH$_4$OH) and an organic solvent to produce a mixture containing 12-16 vol. % of the mixed aqueous solution, 5-6 vol. % of the 0.1-0.2M ammonium hydroxide (NH$_4$OH), and a remaining percentage of the organic solvent;
    stirring the mixture under nitrogen atmosphere for emulsion polymerization to produce a water-in-oil (w/o) emulsion; and
    removing the organic solvent and drying the w/o emulsion to produce aerogel particles.

2. The method as claimed in claim 1, wherein:
    the organosilicon compound containing methyl groups is selected from the group consisting of methyltrimethoxysilane, methyltriethoxysilane, dimethoxydimethylsilane, and dimethyldiethoxylsilane;
    the organic solvent is selected from the group consisting of alkanes, alcohols, ethers, and ketones; and
    the surfactant is selected from the group consisting of hexadecyl-trimethyl-ammonium bromide, sodium dodecyl sulfate, sodium dodecyl benzene sulfonate, and n-hexadecyltrimethylammonium chloride.

3. The method as claimed in claim 1, wherein:
    the mixture is stirred at 1,000-5,000 rpm; and
    the w/o emulsion is dried at 80° C.-150° C. in a normal atmosphere for 2-6 hours.

4. The method as claimed in claim 3, further comprising carrying out heat treatment of the aerogel particles at 400° C.-500° C. under normal atmosphere for 2-8 hours to produce hydrophilic aerogel particles.

* * * * *